C. C. KERR.
MEAT-MANGLER.
No. 170,378.   Patented Nov. 23, 1875.
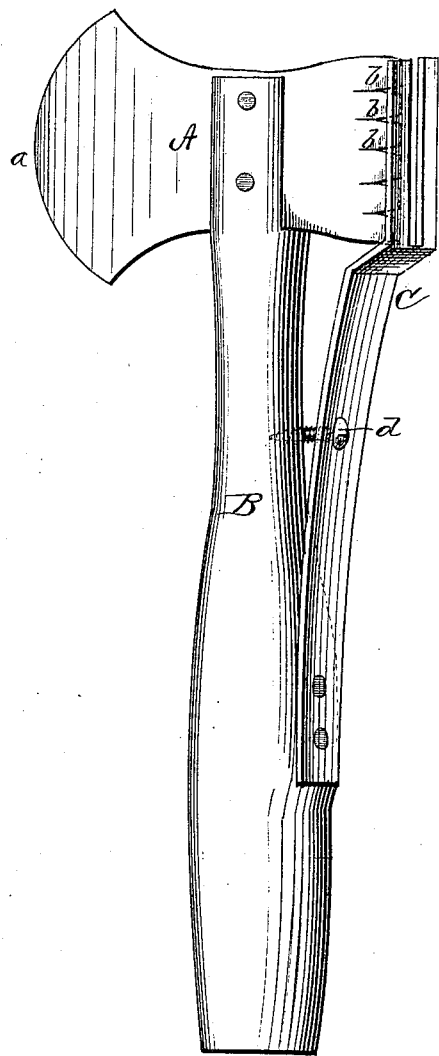

UNITED STATES PATENT OFFICE.

CHRISTOPHER C. KERR, OF SPRINGFIELD, MISSOURI.

IMPROVEMENT IN MEAT-MANGLERS.

Specification forming part of Letters Patent No. 170,378, dated November 23, 1875; application filed June 22, 1875.

*To all whom it may concern:*

Be it known that I, C. C. KERR, of Springfield, in the county of Greene and State of Missouri, have invented certain new and useful Improvements in Meat-Manglers; and I do hereby declare that the following is a full, clear, and exact description thereof, reference being had to the accompanying drawings, and to the letters of reference marked thereon, which form part of this specification.

The nature of my invention consists in the construction and arrangement of a beef-steak mangler, as will be hereinafter more fully set forth.

In order to enable others skilled in the art to which my invention appertains to make and use the same, I will now proceed to describe its construction and operation, referring to the annexed drawing, which represents a perspective view of my invention.

A represents the blade of my beef-mangler, fastened by means of rivets in the forked end of a wooden handle, B. One end of the blade A is formed with a curved cutting-edge, $a$, for cutting meat for hash, the same as with an ordinary knife. The other end of the blade A is made with a series of notches, $b\ b$, forming a series of sharp teeth. The sides and corners of the notches $b$ are made sharp to cut the meat and not bruise, leaving no cords or strings uncut, yet the piece of meat holding together nicely. On the handle B is fastened a spring-guide, C, the outer end of which is bent and forked to fit over and in a plane with the notched edge of the blade. This guide is held from any lateral movement by means of a screw, $d$. The guide C gives or yields as the mangler is brought down on the meat, and the spring of the guide clears the blade from the meat.

Having thus fully described my invention, what I claim as new, and desire to secure by Letters Patent, is—

The combination of the blade A, handle B, and forked spring-guide C, all constructed substantially as and for the purposes herein set forth.

In testimony that I claim the foregoing as my own I affix my signature in presence of two witnesses.

CHRISTOPHER C. KERR.

Witnesses:
 JONATHAN HARPER,
 LEVI SCOTT.